United States Patent
Koenen et al.

(10) Patent No.: US 10,634,041 B2
(45) Date of Patent: *Apr. 28, 2020

(54) IGNITION SYSTEM FOR INTERNAL COMBUSTION ENGINE

(71) Applicant: Briggs & Stratton Corporation, Wauwatosa, WI (US)

(72) Inventors: Robert J. Koenen, Pewaukee, WI (US); Andrew Paskov, Brookfield, WI (US); Jason A. Hansen, Elkhorn, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/406,279

(22) Filed: Jan. 13, 2017

(65) Prior Publication Data

US 2017/0138330 A1    May 18, 2017

Related U.S. Application Data

(60) Continuation-in-part of application No. 15/286,799, filed on Oct. 6, 2016, which is a division of application No. 13/283,697, filed on Oct. 28, 2011, now Pat. No. 9,488,150.

(51) Int. Cl.
| | |
|---|---|
| *F02B 23/08* | (2006.01) |
| *F02P 15/08* | (2006.01) |
| *F02P 1/08* | (2006.01) |
| *F02P 3/04* | (2006.01) |
| *F02P 5/15* | (2006.01) |

(52) U.S. Cl.
CPC .............. *F02B 23/08* (2013.01); *F02P 1/083* (2013.01); *F02P 3/0435* (2013.01); *F02P 15/08* (2013.01); *F02B 2023/085* (2013.01); *F02P 5/1502* (2013.01); *Y02T 10/125* (2013.01)

(58) Field of Classification Search
CPC ..... F02B 2023/085; F02B 23/08; F02P 15/02; F02P 9/002
See application file for complete search history.

(56) References Cited

U.S. PATENT DOCUMENTS

| | | |
|---|---|---|
| 3,552,367 A | 1/1971 | Slitti, Jr. et al. |
| 3,619,634 A | 11/1971 | Burson |
| 3,809,043 A | 5/1974 | Nagasawa |

(Continued)

OTHER PUBLICATIONS

STM8L 2009.*

*Primary Examiner* — Carl C Staubach
(74) *Attorney, Agent, or Firm* — Foley & Lardner LLP (57) ABSTRACT

An ignition system for an internal combustion engine that utilizes a single primary coil and a single secondary coil to drive a pair of spark plugs. Current flowing in both a first direction and a second direction passes through the primary coil. The current flowing through the primary coil induces corresponding current in the secondary coil, which flows from the secondary coil to one of two spark plugs. Each spark plug is coupled to the secondary coil such that each of the two spark plugs receives current flowing only in a single direction. The current flowing through the ignition system can be from either a power source or created by the rotation of a flywheel having a series of magnet clusters.

16 Claims, 8 Drawing Sheets

(56) References Cited

U.S. PATENT DOCUMENTS

| | | | |
|---|---|---|---|
| 3,893,439 | A | 7/1975 | Chudoba |
| 3,910,247 | A * | 10/1975 | Hartig .................. F02P 3/0552 |
| | | | 123/634 |
| 3,938,491 | A | 2/1976 | Mazza |
| 3,941,111 | A | 3/1976 | Carmichael et al. |
| 4,054,113 | A | 10/1977 | Sleder et al. |
| 4,090,488 | A | 5/1978 | Ohki et al. |
| 4,173,963 | A | 11/1979 | Heuwieser et al. |
| 4,228,780 | A | 10/1980 | Kiess |
| 4,275,322 | A | 6/1981 | Cavil et al. |
| 4,334,509 | A | 6/1982 | Nash |
| 4,428,333 | A | 1/1984 | Erhard |
| 4,462,356 | A | 7/1984 | Hirt |
| 4,463,744 | A | 8/1984 | Tanaka et al. |
| 4,464,092 | A | 8/1984 | Chambers et al. |
| 4,770,152 | A | 9/1988 | Mogi et al. |
| 4,892,079 | A | 1/1990 | Umezu et al. |
| 4,916,343 | A | 4/1990 | Umemoto et al. |
| 5,056,481 | A | 10/1991 | Podrapsky et al. |
| 5,072,714 | A | 12/1991 | Bengtsson et al. |
| 5,245,348 | A | 9/1993 | Nishikawa et al. |
| 5,265,573 | A | 11/1993 | Imoli |
| 5,313,918 | A | 5/1994 | Agren |
| 5,477,841 | A | 12/1995 | Trost et al. |
| 5,962,939 | A | 10/1999 | Nakamura et al. |
| 6,076,503 | A | 6/2000 | Carpenter |
| 6,388,445 | B1 | 5/2002 | Andersson |
| 6,932,064 | B1 | 8/2005 | Kolak et al. |
| 6,976,472 | B2 | 12/2005 | Nickel |
| 7,362,018 | B1 | 4/2008 | Kulogo et al. |
| 7,644,707 | B2 | 1/2010 | Kraus et al. |
| 2003/0089336 | A1 | 5/2003 | Kiessling |
| 2007/0181110 | A1 * | 8/2007 | Toriyama ............. F02P 3/0552 |
| | | | 123/637 |

\* cited by examiner

IGNITION SYSTEM FOR INTERNAL COMBUSTION ENGINE

CROSS REFERENCE TO RELATED APPLICATION

This application is continuation-in-part application of prior U.S. patent application Ser. No. 15/286,799, filed on Oct. 6, 2016, which is a divisional application of prior U.S. patent application Ser. No. 13/283,697, filed on Oct. 28, 2011, now issued as U.S. Pat. No. 9,488,150, entitled IGNITION SYSTEM FOR INTERNAL COMBUSTION ENGINE.

BACKGROUND

The present disclosure relates to an ignition system for an internal combustion engine. More specifically, the present disclosure relates to an ignition system that utilizes a single primary coil and a single secondary coil to provide current to more than one spark plug of an internal combustion engine.

Inductive ignition systems for internal combustion engines are known and typically utilize a permanent magnet connected to a flywheel that rotates along with a crankshaft. The rotating magnet or magnets pass by an ignition coil wound on a magnetic core that includes both primary windings and secondary windings. The secondary winding is connected to a spark plug such that current induced in the secondary winding provides the ignition source for the spark plug.

Inductive ignition systems typically include a trigger coil generally located close to the ignition coil. The trigger coil operates to interrupt the flow of current, which induces a high secondary voltage that triggers the spark between the spark plug electrodes. Typically, a separate primary and secondary winding is used for each cylinder of an internal combustion engine. This use of multiple windings increases the cost of the ignition system of the internal combustion engine.

Other types of ignition systems exist that utilize relatively expensive control units that control the timing of ignition pulses sent to multiple spark plugs of multiple cylinders. Although ignition systems that include electronic control units are able to control the timing of ignition signals, the cost of the electronic control unit is oftentimes prohibitive when the ignition system is used with a small, inexpensive internal combustion engine.

SUMMARY

The present disclosure relates to an ignition system for use with an internal combustion engine to provide the required current to one or more spark plugs. The ignition system of the present disclosure utilizes a single primary coil to provide current to a single secondary coil coupled to the spark plugs in both a first direction and a second direction, wherein the current in the first direction is supplied to a first spark plug and current flowing in the second direction is supplied to a second spark plug.

In accordance with a first embodiment of the disclosure, the ignition system is utilized with an internal combustion engine having a flywheel including multiple magnets spaced around the outer circumference of the flywheel. The magnets spaced around the outer circumference of the flywheel have either a first polarity or a second polarity.

As the flywheel rotates, the magnets pass a primary coil that is positioned adjacent to the flywheel. As the magnets pass the primary coil, a first current flowing in a first direction is induced in the primary coil when magnets having the first polarity rotate past the primary coil. A second current flowing in a second, opposite direction, is induced in the primary coil when magnets having the second polarity rotate past the primary coil.

The ignition system further includes a single secondary coil positioned adjacent to the primary coil such that the current flowing through the primary current is induced into the secondary coil. The first and second currents induced in the secondary coil flow in opposite directions depending upon the direction of current flow in the primary coil.

In a first embodiment, the secondary coil is connected to a first spark plug through a first flow restrictor. The first flow restrictor is configured such that current can flow through the first flow restrictor only in a first direction. A second spark plug is connected to the secondary coil through a second flow restrictor. The second flow restrictor is oriented such that current flowing only in the second direction reaches the second spark plug. As indicated above, the first and second flow restrictors are positioned in opposite directions. In one embodiment of the disclosure, the first and second flow restrictors are diodes oriented in opposite directions.

In an alternate embodiment, a first side of the secondary coil is connected directly to the first spark plug while a second side of the secondary coil is connected directly to the second spark plug. In such an embodiment, a first diode is connected between the first side of the secondary coil and ground while a second diode is connected between the second side of the secondary coil and ground. When current is induced in the primary coil in the first direction, the orientation of the diodes connected to the opposite sides of the secondary coil allows current to flow through the first spark plug. When current is induced in the primary coil in the second direction, the orientation of the diodes allows current to flow through the second spark plug. In such an embodiment, the orientation of the diodes on opposite sides of the secondary coil dictates the direction of current flow and thus allows current to flow through either the first spark plug or the second spark plug.

In an alternate contemplated embodiment, the ignition system further includes a controller coupled to the primary coil. The controller is operable to generate first and second output signals that are provided to opposite sides of the primary coil. The first and second output signals generated by the controller are used to control the timing of the current induced in the secondary coil of the ignition system. In this manner, the controller is able to vary the timing of the generation of sparks by the spark plugs.

In one contemplated embodiment, the controller of the ignition system is powered by induced current flowing through a trigger coil. The current flowing through the trigger coil is also utilized by the control unit to sense the rotational speed of the internal combustion engine.

In another contemplated embodiment, the ignition system includes a power supply that creates the current flowing through a primary coil. The power supply is connected to the primary coil by a first switch member and a second switch member. The primary coil is connected to ground through a third switch member and a fourth switch member. The connection of the primary coil between the power supply and ground is part of an H-bridge circuit.

A controller of the ignition system monitors the rotational speed of the engine and is operable to generate both a first output and a second output. The first output of the controller is connected to the first and fourth switch members, while the second output of the controller is connected to the second and third switch members.

During operation of the ignition system, the controller generates a signal at the first output, which activates the first and fourth switch members. When the first and fourth switch members are activated, current flows from the power supply through the primary coil in a first direction. The controller can also generate a second output, which activates the second and third switch members. When the second and third switch members are activated, current flows from the power supply through the primary coil in a second direction opposite the first direction. In this manner, the controller can selectively apply the power supply to the primary coil such that current flows in either a first direction or a second direction.

In another contemplated embodiment, the ignition system is designed to interface with an engine control unit (ECU) that is programmed to control the application of current through two separate primary windings each assigned to one of two cylinders of an internal combustion engine. The ignition system converts the low value triggering output signals from the ECU into signals that activates the first, second, third and fourth switch members of an ignition system to allow current to flow from a power supply through a single primary coil in both a first and a second direction. Such design allows the ignition system to be used with an ECU designed for use with a prior art ignition system including two separate ignition coils.

The ignition system further includes a single secondary coil positioned adjacent to the primary coil. When current is flowing through the primary coil, current flowing in the same direction is induced in the secondary coil. Thus, current is induced in the secondary coil traveling in both the first and second directions.

In one embodiment, a first spark plug is connected to the secondary coil through a first restrictor while a second spark plug is connected to a secondary coil through the second restrictor. As with the embodiment described above, the first and second restrictors are oriented in opposite directions to control the flow of current to only one of the spark plugs at a time. In this manner, the single primary coil can provide the required current to multiple spark plugs of an internal combustion engine.

As described above, alternate configurations are available for connecting the first and second spark plugs to the secondary coil. In the alternate configurations, the first and second spark plugs are connected to opposite sides of the secondary coil and diodes are used to control the flow of current through either the first spark plug or the second spark plug.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
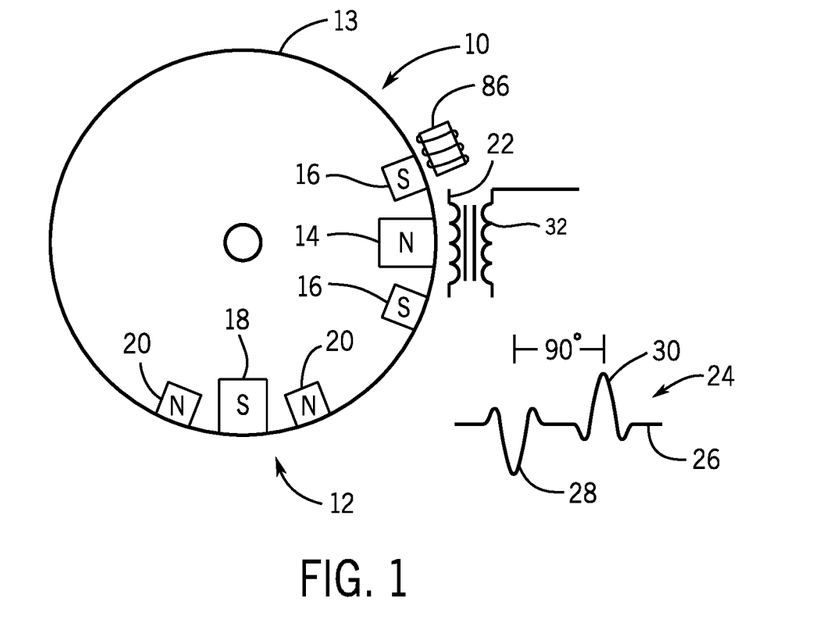
FIG. 1 is a schematic illustration of a flywheel that includes multiple magnetic clusters that induce current in a primary coil upon rotation past the primary coil.

FIG. 1 illustrates a flywheel 10 that forms part of an ignition system of the present disclosure. The flywheel 10 is a circular member having a series of permanent magnet clusters positioned at regular intervals along the outer circumference 13 of the flywheel. In the embodiment shown in FIG. 1, magnetic clusters 12 are positioned 90° from each other along the outer circumference of the flywheel 10. Although the magnetic clusters 12 shown in FIG. 1 are spaced at a 90° interval, it is contemplated that the magnetic clusters 12 could be spaced at other intervals, such as 180° or 60°.

As illustrated in FIG. 1, the magnetic clusters 12 positioned 90° apart have different orientations. In the embodiment shown in FIG. 1, the magnetic cluster 12 positioned at the 3 o'clock position has a large north magnetic pole 14 positioned between two smaller south magnetic poles 16. The magnetic cluster 12 positioned at the 6 o'clock position includes a large south magnetic pole 18 positioned between two smaller north magnetic poles 20.

As illustrated in FIG. 1, a primary coil 22 is positioned close to the outer circumference of the flywheel such that as the flywheel rotates, the movement of the magnetic clusters 12 past the primary coil 22 induces a current in the primary coil 22. The current flowing in the primary coil 22 is induced through the secondary coil 32 in a well-known manner. As illustrated by the waveform 24, the rotation of the magnetic clusters 12 past the primary coil 22 induces a current 26 having a repeating negative peak 28 and a positive peak 30. The negative and positive peaks 28, 30 are separated by 90° of rotation of the flywheel 10 due to the spacing of the magnetic cluster 12.

Figure 2A:
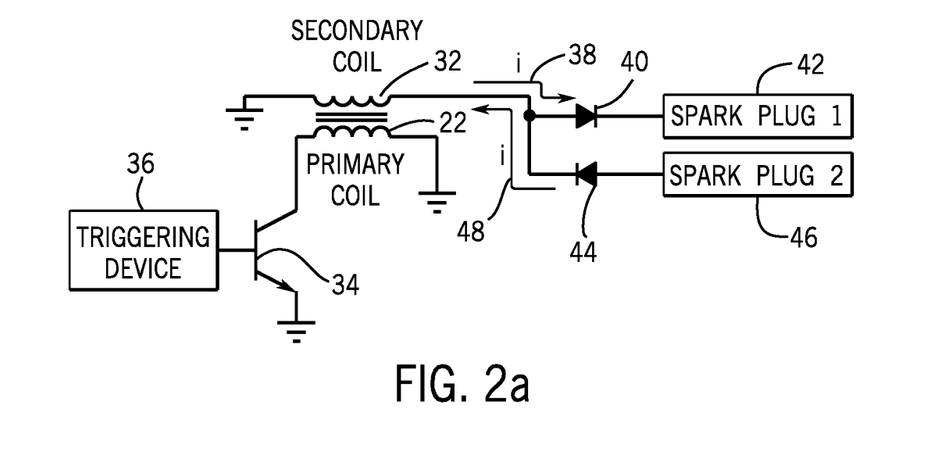
FIG. 2a is a schematic illustration of a first embodiment of the ignition system of the present disclosure when utilized with the flywheel of FIG. 1.

Referring now to FIG. 2a, the primary coil 22 is positioned adjacent the secondary coil 32 such that the current flowing through the primary coil can be interrupted to induce a corresponding current in the secondary coil 32. The primary coil 22 is connected to ground through a switching member 34. The switching member 34 shown in FIG. 2a is a transistor having its base connected to a triggering device 36. In the embodiment of FIGS. 1 and 2a, the triggering device 36 includes a trigger coil 86. As can be understood in FIG. 1, when the magnetic clusters 12 rotate past the trigger coil 86, the trigger coil 86 activates the switching member 34 to interrupt the flow of current through the primary coil 22. Although a trigger coil 86 is illustrated in the embodiment of FIGS. 1 and 2a, the triggering device 36 could have other alternate configurations while operating within the scope of the present disclosure. The interruption in current creates a sudden and considerable flux variation, which induces a high secondary voltage on the secondary coil 32. The triggering device 36 thus controls whether the switching member 34 is in an open or closed condition. Thus, the induction of current between the primary coil and the secondary coil is controlled by the triggering device 36.

When the triggering device 36 opens the switching member 34, the current flowing through the primary coil, which is illustrated by waveform 24 in FIG. 1, is suddenly interrupted, which induces a high secondary voltage and current in the secondary coil 32. Since the current shown by waveform 24 oscillates between a negative peak 28 and a positive peak 30, a first current flowing in a first direction flows through the primary coil as the first magnetic cluster passes by the primary coil while a second current flowing in an opposite, second direction flows through the primary coil when the next magnetic cluster 12 rotates past the primary coil 22. Thus, the first and second currents flow through the primary coil at alternating times. The current induced in the secondary coil 32 also flows in the opposite first and second directions.

When current is flowing in the first direction through the secondary coil 32, as shown by arrow 38, the current flows through a first flow restrictor 40 and provides the current required to activate the first spark plug 42. When current is flowing in the first direction, shown by arrow 38, the flow of current is blocked by the second flow restrictor 44 such that the current does not reach the second spark plug 46. As illustrated, the first and second flow restrictors are diodes oriented in opposite directions.

When the second current is induced in the secondary coil, which is represented by arrow 48, the second current flows in the opposite direction and thus is allowed to pass through the second flow restrictor 44. The first flow restrictor 40 is positioned in an opposite orientation to prevent the flow of the second current 48 to the first spark plug 42. The orientation of the first and second flow restrictors 40, 44 insures that the first current flow 38 reaches only the first spark plug 42 while the second current flow 48 reaches only the second spark plug 46. As can be understood by the above description, the single primary coil 22 positioned adjacent to the flywheel allows current to be induced in the secondary coil 32 in both a first and second direction, which provides the required current for activating both the first spark plug 42 and the second spark plug 46 separately.

Figure 2B:
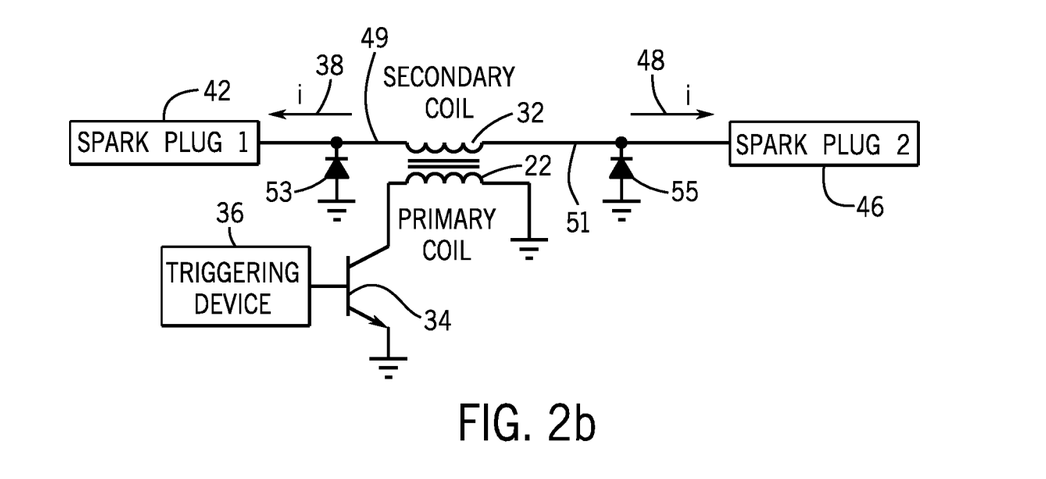
FIG. 2b is a schematic illustration of a second, alternate embodiment of the ignition system of the present disclosure.

FIG. 2b illustrates an alternate embodiment for the ignition circuit illustrated in FIG. 2a. In the alternate embodiment of FIG. 2b, the first spark plug 42 is connected to the first side 49 of the secondary coil 32 while the second spark plug 46 is connected to the second side 51 of the secondary coil 32. The first side 49 of the secondary coil is connected to ground through a first diode 53 while the second side 51 of the secondary coil 32 is connected to ground through a second diode 55.

In the embodiment of FIG. 2b, when current is induced in the primary coil 22 in a first direction, the current flowing through the primary coil 22 creates a voltage difference across the first and second sides of the secondary coil 32. Based on the voltage difference, one of the two diodes will be active and function as a connection to ground. The connection to ground creates a current path and the voltage difference created across the secondary coil results in the current flow 38 through the first spark plug 42. When the direction of current flow through the primary coil is reversed, the orientation of the diodes 53, 55 results in a second current flow 48 flowing through the second spark plug 46. The configuration shown in FIG. 2b is an alternate to the configuration of FIG. 2a and is used to insure that current flows through only one of the two spark plugs 42, 46, depending upon the direction of current flow through the primary coil 22.

Figure 2C:
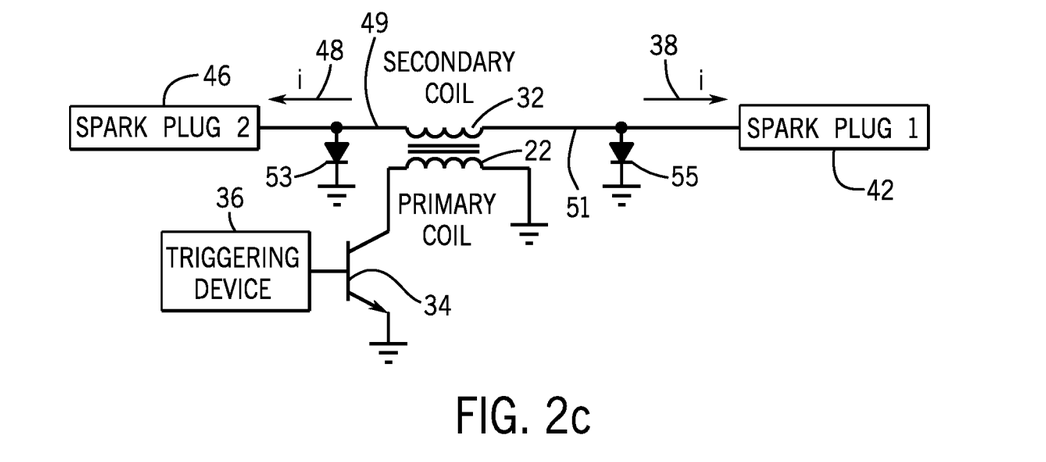
FIG. 2c is another alternate configuration of the ignition system of the present disclosure.

FIG. 2c illustrates yet another alternate embodiment similar to the embodiment shown in FIG. 2b. In the embodiment of FIG. 2c, the orientation of the diodes 53 and 55 is reversed. The reversal of the orientation of diodes 53, 55 reverses the direction of current flow through the secondary coil as compared to the primary coil. As a result, the first spark plug 42 is connected to the second side 51 of the secondary coil while the second spark plug 46 is connected to the first side 49 of the secondary coil 32.

In the embodiments shown in FIGS. 2b and 2c, similar reference numerals are used to the embodiment shown in FIG. 2a since these components are essentially the same in each embodiment. It should be understood that other types of configurations could be utilized to control the directional flow through the first and second spark plugs such that current flows through only one of the two spark plugs at a time depending upon the direction of current flow through the primary coil 22.

Figure 3:
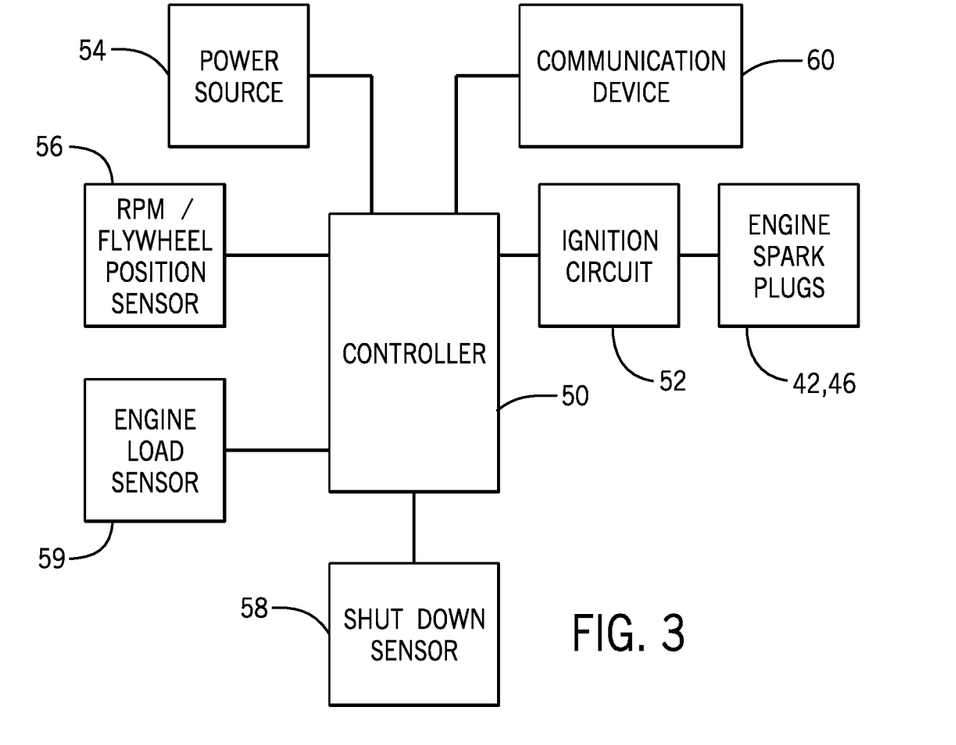
FIG. 3 is a block diagram of the ignition system of the present disclosure.

In the embodiment shown in FIGS. 1 and 2a-2c, the ignition timing to the first and second spark plugs 42, 46 is directly controlled by the rotation of the flywheel 10 past the trigger coil 86. Although this type of ignition control system is effective for triggering the activation of the first and second spark plugs 42, 46 in direct correspondence with the rotation of the flywheel 10, it is contemplated that it may be desirable to delay the activation of the spark plugs 42, 46 relative to the rotation of the magnetic clusters 12 past the primary coil 22. In such an embodiment, a controller 50, such as shown in FIG. 3, could be included with the ignition circuit 52. The controller 50 could be many different types of controllers, such as a low cost microcontroller, while operating within the scope of the present disclosure. The controller 50 needs only relatively minimal processing power to control the timing of the ignition pulses sent to the spark plugs 42, 46.

In the schematic embodiment shown in FIG. 3, a power source 54 is connected to the controller 50 to provide power to operate the controller 50. The power source 54 can be one of many different types of power sources, such as a battery or a power supply created by rotation of the flywheel past a triggering coil as will be described below.

In the embodiment shown in FIG. 3, a flywheel sensor 56 is connected to the controller 50 to provide information to the controller as to the rotational speed of the internal combustion engine. Additionally, a shut-down sensor 58 may be connected to the controller 50. The shut-down sensor can be used to provide a signal to the controller 50 such that the controller 50 immediately discontinues operation of the internal combustion engine. In addition, an engine load sensor 59 can be coupled to the controller 50 to provide information to the controller 50 related to the load currently seen by the engine. Typically, the controller 50 discontinues operation of the internal combustion engine by restricting the flow of current to the spark plugs 42, 46, thus preventing engine firing. In the embodiment shown in FIG. 3, a communication device 60 is also connected to the controller 50. The communication device can be one of many different types of components, such as a display screen, a series of indicator lights, or any other similar component that allows the controller 50 to communicate information to a user/operator of a machine, such as a lawn mower, including the internal combustion engine. Additionally, the communication device 60 can also communicate information entered by the user/operator such that the controller 50 can adapt operation of the machine based upon the user inputs. The communication device 60 can take many different forms while operating within the scope of the present disclosure.

Figure 4:
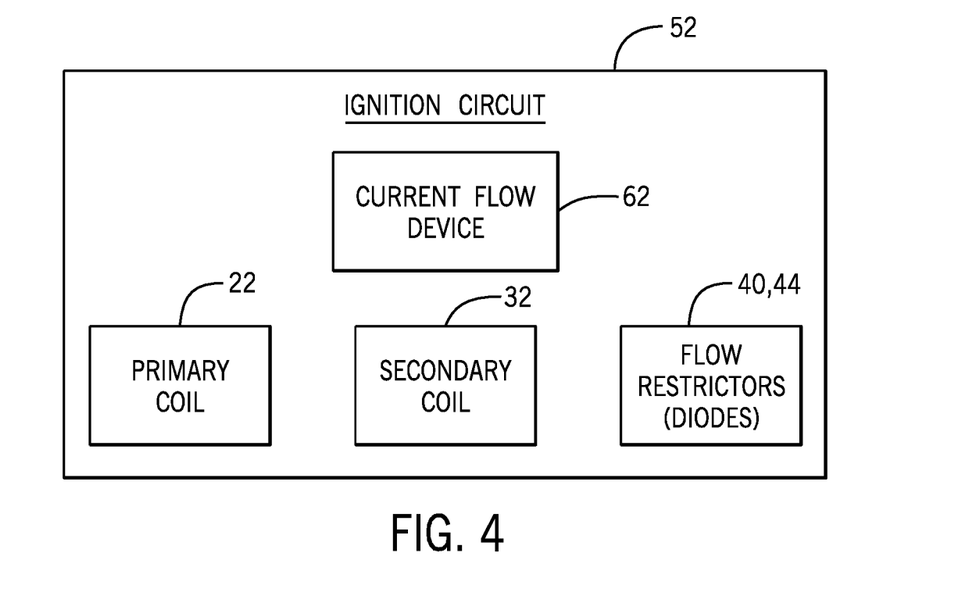
FIG. 4 is a block diagram illustrating the ignition circuit that forms part of the ignition system of FIG. 3.

Referring now to FIG. 4, the ignition circuit 52 that forms part of the entire system of FIG. 3 can have various different components while operating within the scope of the present disclosure. As described previously, the ignition circuit 52 includes a primary coil 22, a secondary coil 32 and flow restrictors 40, 44. The flow restrictors are positioned to allow current flowing in a first direction to reach only the first spark plug 42 while current flowing in the second direction reaches only the second spark plug 46. In an embodiment to be described below, the ignition circuit 52 can include a current flow device 62 that controls the flow of current through the primary coil 22 from a power source 54, such as a storage battery. In alternate embodiments, the current flow device can be eliminated, such as in the embodiment shown in FIG. 2.

Figure 5:
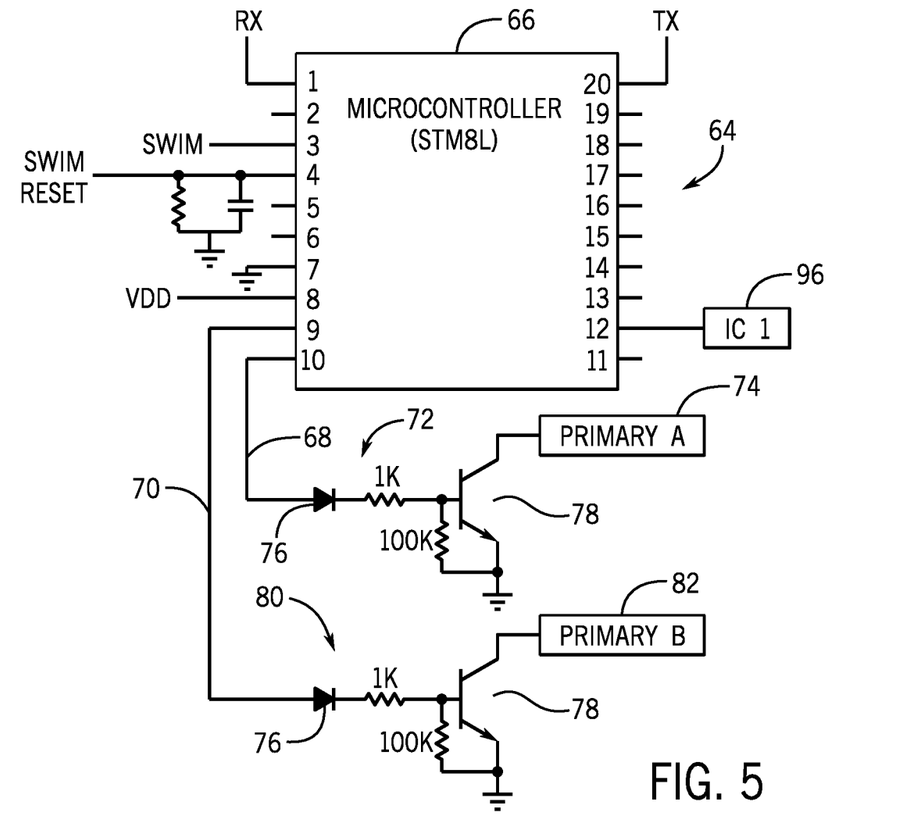
FIG. 5 is a schematic illustration of a magnetic powered ignition system of the present disclosure.
Figure 6:
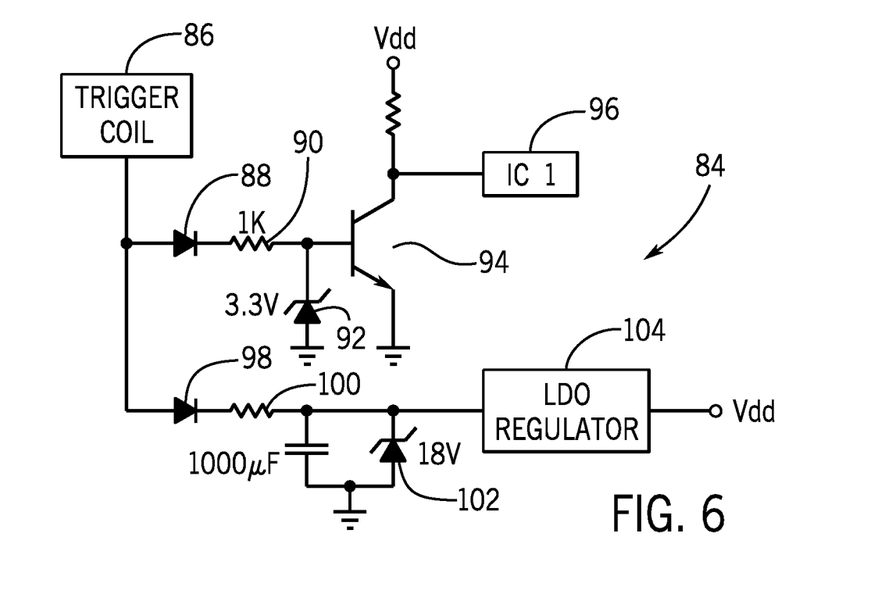
FIG. 6 is a schematic of a circuit utilized to generate both an RPM signal and a power source based upon current induced through a trigger coil.
Figure 7:
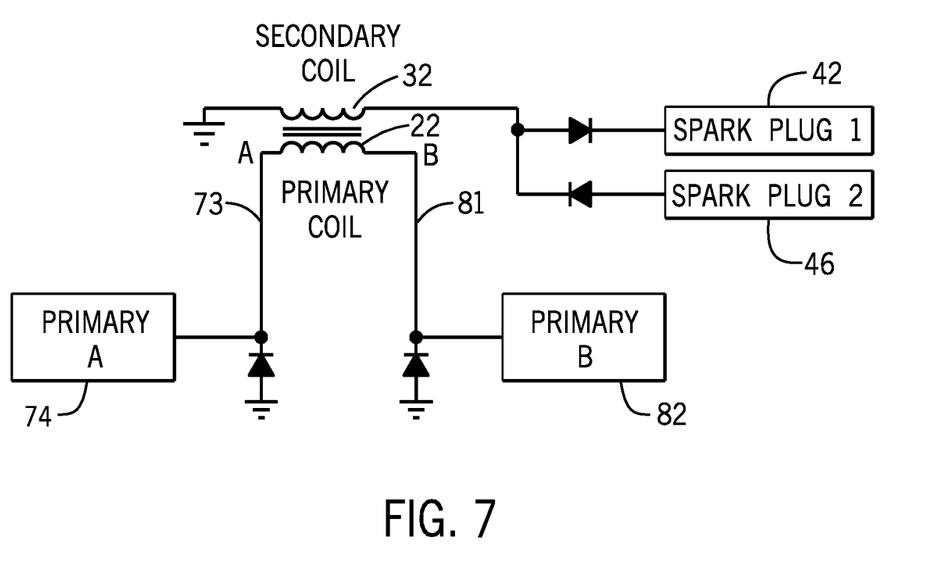
FIG. 7 is a schematic illustration of the output of the controller of FIG. 5 used to control the flow of current through a primary coil.

FIGS. 5-7 illustrate an alternate embodiment that can be used with the flywheel 10 shown in FIG. 1. In the embodiment shown in FIG. 5, the ignition system 64 includes a controller 66. The controller 66 includes multiple inputs and multiple outputs and is used to slightly delay the supply of current to the first and second spark plugs 42, 46, as shown in FIG. 7. The controller 66 shown in FIG. 5 generates a first output along line 68 and a second output along line 70. The first output along line 68 is fed into a first switching member 72 which is connected to a first 73 side of the primary coil, as illustrated by box 74. The switching member 72 includes a diode 76 and a transistor 78.

The second output along line 70 is connected to a second switching member 80 which also includes a diode 76 and a transistor 78. The second switching member 80 is connected to a second side 81 of the primary coil 22 as indicated by box 82 in FIG. 5. As can be seen by a comparison between FIGS. 5 and 7, the first and second outputs generated by the controller 66 are received on opposite sides of the primary coil 22. Since the primary coil 22 is positioned adjacent to the flywheel as was described with reference to FIG. 1, first and second currents are induced in the primary coil 22 in opposite first and second directions. The controller 66 shown in FIG. 5 can control the activation of the first and second switching members 72, 80 to control when the current flowing through the primary coil 22 is induced into the secondary coil 32. Since the spark plugs 42, 46 can only be powered when an adequate amount of current is being induced into the secondary coil 32, the delay created by the controller 66 is limited. Specifically, the delay in generating current to the spark plugs can only be such that the current induced into the secondary coil 32 occurs in either the negative peak or the positive peak of the induced current, such as shown in FIG. 1. However, the controller 66 is able to control the timing of the sparks in each of the two cylinders of the internal combustion engine by controlling the time at which the first and second output signals are generated along lines 68, 70.

Referring now to FIG. 6, thereshown is a triggering and voltage generation circuit 84 in accordance with one embodiment of the present disclosure. In the embodiment shown in FIG. 6, the current induced in the trigger coil 86 passes through diode 88 and generates a voltage across the resistor 90. A voltage regulating Zener diode 92 clips the voltage at 3.3 volts, which is supplied to the base of transistor 94. Since the trigger coil 86 generates current only when one of the magnetic clusters is passing by the trigger coil, the voltage at the collector of transistor 94 can be used as an RPM sensor, as indicated by box 96. Alternatively, the trigger coil 86 can also be used as a flywheel/crankshaft/piston location sensor for various different timing operations within the controller 66. As can be seen in FIG. 5, the RPM sensing signal from the circuit 84 is fed into the controller 66 such that the controller 66 can sense the rotational speed of the engine. Based upon this rotational speed, the microcontroller 66 can set the desired amount of delay before a spark is generated by the pair of spark plugs.

Referring back to FIG. 6, the trigger coil 86 is connected to a resistor 100 through diode 98. A voltage regulating Zener diode 102 controls the value of current supplied to a voltage regulator 104. The output of the voltage regulator, $V_{dd}$, is used to power the microcontroller. In this manner, the microcontroller 66 does not need an external power supply, such as a battery, but instead draws power from the rotation of the internal combustion engine, which induces a voltage through the trigger coil 86. Likewise, rotation of the internal combustion engine induces current through the trigger coil 86, which is also used by the controller 66 of FIG. 5 as an RPM sensor or as a flywheel/crankshaft/piston location sensor for timing.

Figure 8:
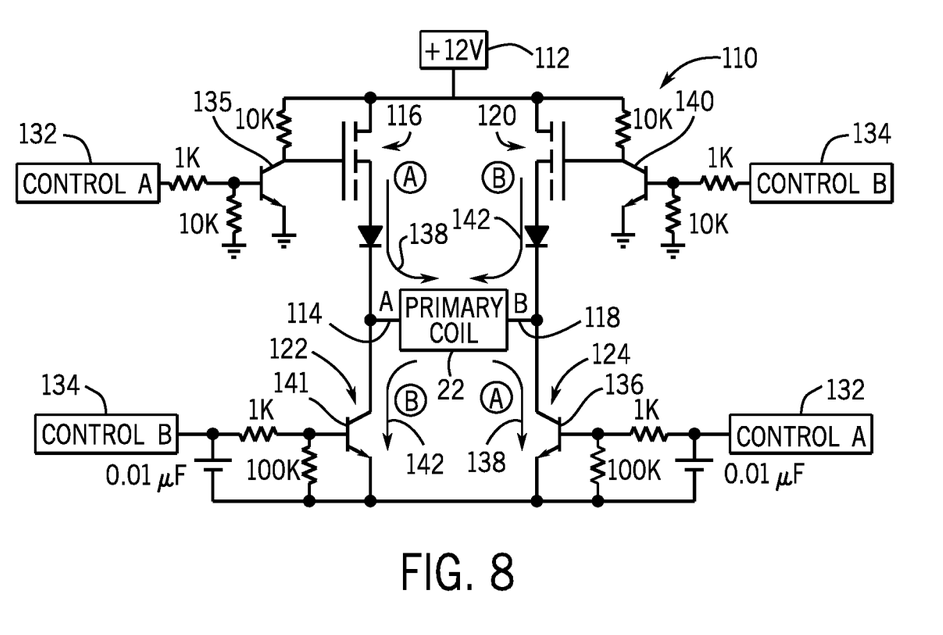
FIG. 8 is a schematic illustration of an ignition system utilizing a power supply to control the flow of current through a primary coil.

FIG. 8 illustrates yet another embodiment of an ignition circuit 110 of the present disclosure. In the ignition circuit 110 shown in FIG. 8, the ignition circuit utilizes an external power source 112, rather than the rotating magnetic clusters on the flywheel, to generate current that flows in opposite directions through the primary coil 22. In the embodiment shown in FIG. 8, the power source 112 is a 12-volt battery, although other types of power sources are contemplated as being within the scope of the present disclosure. In the embodiment shown in FIG. 8, the power source 112 is connected to a first side 114 of the primary coil 22 through a first switching member 116. The power source 112 is connected to an opposite, second side 118 of the primary coil 22 through a second switching member 120.

Figure 10:
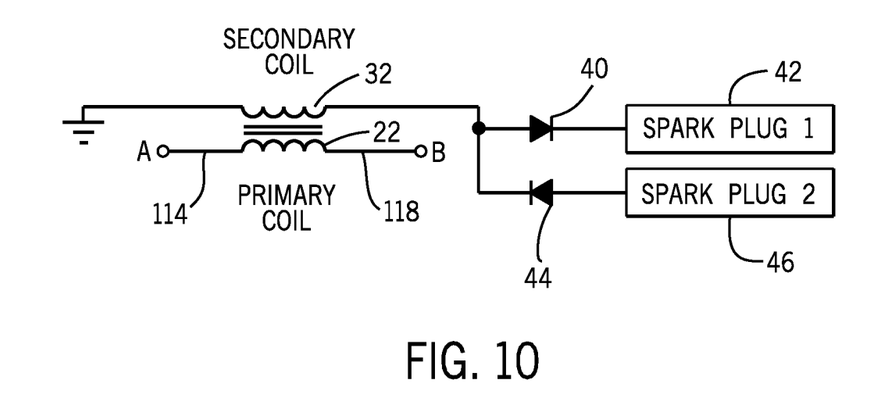
FIG. 10 is a schematic illustration showing the induction of current from the primary coil to the secondary coil for the ignition circuit of FIG. 8.

The first side 114 of the primary coil is connected to ground through a third switching member 122 while the second side 118 of the primary coil 22 is connected to ground through a fourth switching member 124. The primary coil 22 shown in FIG. 8 is coupled to the secondary coil 32, as illustrated in FIG. 10. The configuration shown in FIG. 10 is similar to the configuration shown in FIG. 2a such that when current flows through the primary coil 22 in a first direction from the first side 114 to the second side 118, the flow restrictor 40 allows the current to reach the first spark plug 42. When the current flows in an opposite, second direction from the second side 118 to the first side 114, the flow restrictor 44 allows the current to reach the second spark plug 46. Thus, depending upon the direction of current flow through the primary coil 22, either the first spark plug 42 or the second spark plug 46 will be activated. In a further alternate embodiment, the configuration shown in FIG. 10 could be replaced by the alternate configurations of FIGS. 2b and 2c while operating within the scope of the present disclosure.

Figure 9:
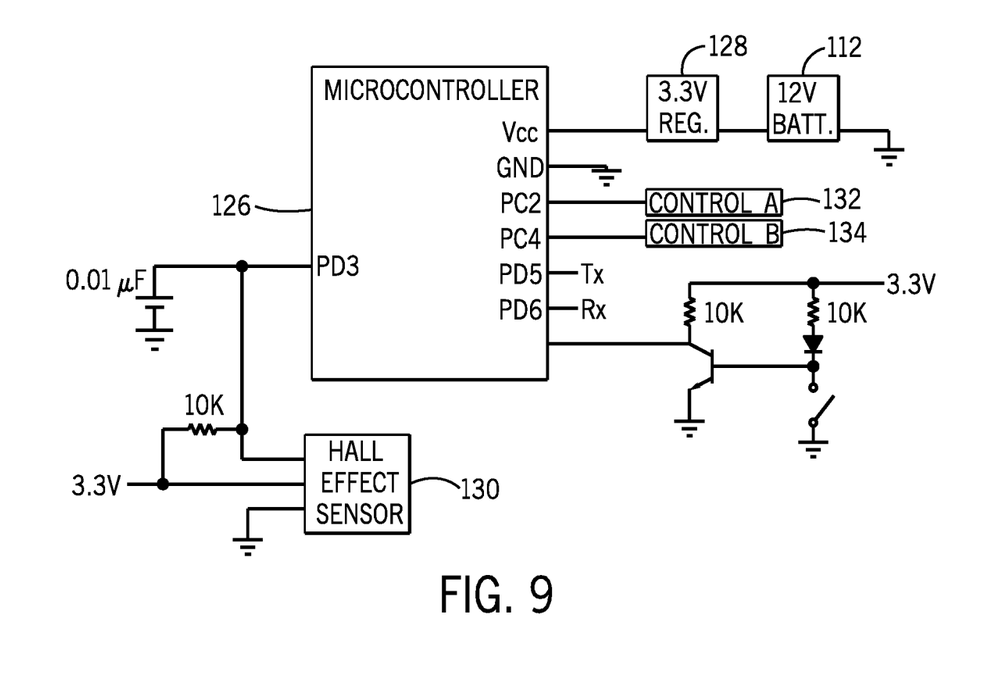
FIG. 9 is a schematic illustration of a controller that is utilized to generate first and second outputs to control the position of switching elements in FIG. 8.

Referring back to FIG. 8, the ignition circuit 110 is controlled by signals present at boxes 132 and 134, which are generated by a controller 126 shown in FIG. 9. The controller 126 is connected to the power source 112 through a voltage regulating circuit 128 that reduces the power source 112 down to the required voltage to power the controller 126. The controller 126 receives a timing signal from a Hall effect sensor 130, or other similar type of sensor or switch, such as a magnet reed switch. The Hall effect sensor 130 provides an input to the controller 126 indicating the current rate of rotation of the internal combustion engine. Based upon this information, the controller 126 can control the rate at which ignition signals are sent to the individual spark plugs. In the embodiment shown in FIG. 9, the controller generates a first pulse wave modulated output signal as indicated by box 132 or a second pulse wave modulated output signal as indicated by box 134. The output signal could be a pulse width train for a multi-strike ignition spark or a single pulse for a standard single-strike ignition spark.

Referring now to FIGS. 8 and 9, when the controller 126 generates a first output signal, which is represented by a high value at boxes 132, the high value turns on both the first switching member 116 and the fourth switching member 124. Specifically, the high value present at box 132 turns on transistors 135 and 136, respectively. When these two transistors 135 and 136 are turned on, current flows from the power source 112 through the first switching member 116, as illustrated by arrow 138. The current flows through the primary coil 22 from the first side 114 to the second side 118. The current leaving the primary coil 22 passes through the fourth switching member 124. As described previously with reference to FIG. 10, when current is flowing from the first side 114 to the second side 118, the current is induced in that direction in the secondary coil 32 and passes through the flow restrictor 40 into the first spark plug 42.

After the first flow of current, the controller 126 turns off the first output present at box 132 and generates a second output that is present at boxes 134. When a high signal is present at boxes 134, transistor 140 turns on, which allows current to flow through the second switching member 120, as illustrated by arrow 142. When current flows in the direction shown by arrow 142, the current passes through the primary coil 22 from the second side 118 to the first side 114. Since a high value is present at box 134, transistor 141 is turned on, which allows the current to flow through the transistor to ground as illustrated by arrow 142.

As described previously with reference to FIG. 10, when current is flowing through the primary coil in the second direction from the second side 118 to the first side 114, the current induced in the secondary coil 32 flows through the flow restrictor 44 and into the second spark plug 46. Thus, the direction of current flow through the primary coil 22 controls whether the first spark plug 42 or the second spark plug 46 is activated. As can be understood in FIGS. 8-10, the timing of the current supplied to the pair of spark plugs 42, 46 is controlled by the controller 126. The Hall effect sensor 130 provides an input signal to the microcontroller 126 such that the microcontroller 126 can control the timing of the energization of the spark plugs 42, 46 through the output signal present at boxes 132 and 134. The controller 126 is thus not limited by the rotation of the magnetic clusters past the primary coil, as was the case in the previous embodiments described above.

Figure 11:
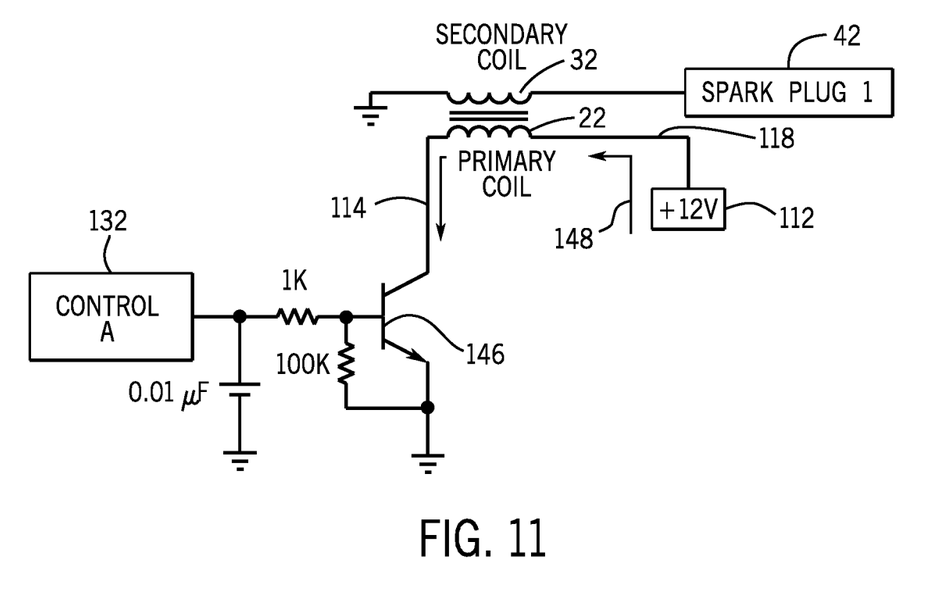
FIG. 11 is a schematic illustration of the use of the circuit in FIG. 9 to control the activation of a spark plug in a single cylinder engine.

In the embodiment shown in FIGS. 8-10, the ignition circuit 110 is utilized with an engine having two cylinders. Alternatively, the circuit shown in FIGS. 8 and 9 could be utilized with an engine only having a single cylinder. In such an embodiment, which is shown in FIG. 11, only the first output signal, present at box 132, is applied to the first side 114 of the primary coil 22. The second side 118 of the primary coil 22 is connected to the power source 112. When the signal at box 132 is high, a first switching member 146 is closed, which allows current to flow in the direction shown by arrow 148. When current flows through the primary coil from the second side 118 to the first side 114, the current is induced into the secondary coil 32, which provides the required current to drive the first spark plug 42. Since the engine in the embodiment shown in FIG. 11 includes only a single cylinder, only the first spark plug 42 is illustrated.

Figure 12:
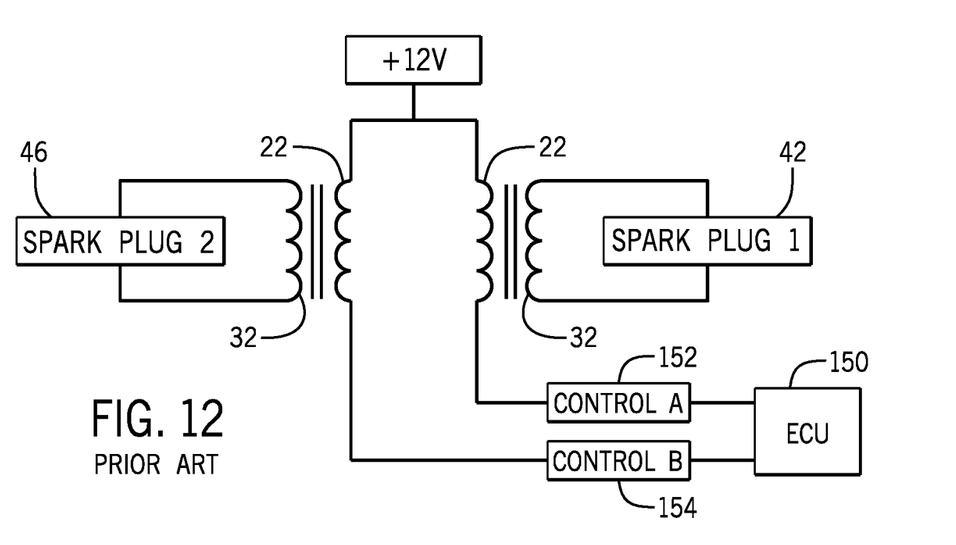
FIG. 12 is a schematic illustration showing the use of an ECU to control current flow through two separate primary coils.
Figure 13:
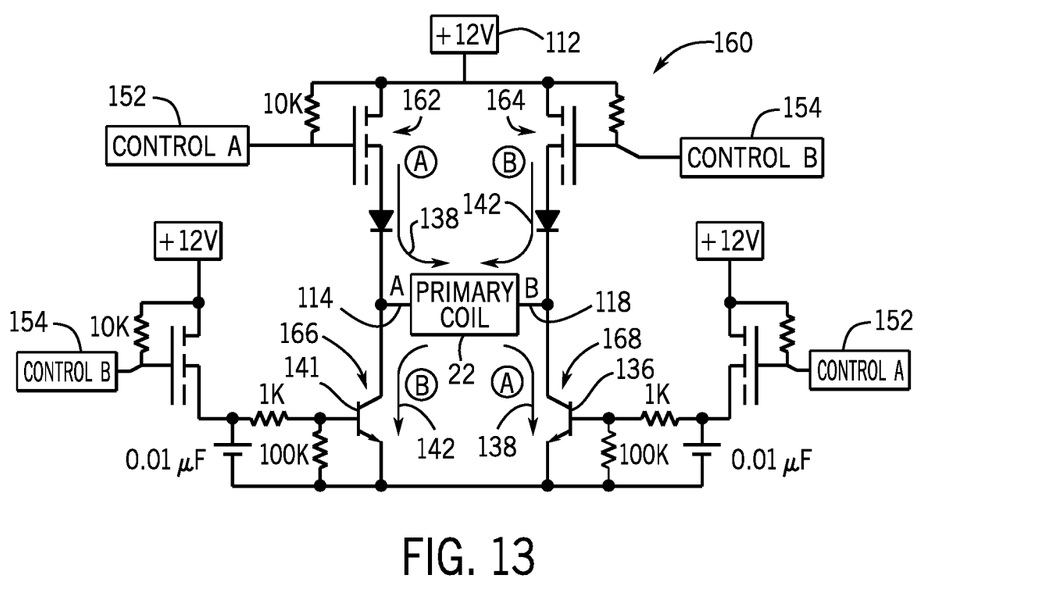
FIG. 13 is a modified schematic illustration of an ignition system for use with the ECU of FIG. 12 to control the flow of current through a single primary coil.

FIGS. 12 and 13 illustrate a modification to the ignition circuit 110 shown in FIG. 8 such that the ignition circuit can be utilized with a currently available ECU 150 that is programmed to control the spark ignition for an engine having two cylinders in which each of the two cylinders includes its own primary coil 22 and secondary coil 32 to control the spark generated by a first spark plug 42 and a second spark plug 46. The ECU 150 is an external controller that is external to the ignition coils or ignition assembly/module. In the embodiment shown in FIG. 12, the external power source 112 is connected to each of the two primary coils 22. The opposite side of each of the primary coils 22 is connected to the ECU 150. The ECU 150 generates a first output signal as indicated by box 152 and a second output signal as indicated by box 154 to initiate and control the timing of the activation of the spark plug. The control output signal at both box 152 and 154 is a low value when the ECU 150 triggers one of the spark plugs by allowing current to flow through either of the two primary coils 22. Internally, the ECU 150 includes a series of transistors that separately connect the low side of each primary coil 22 to ground, which allows current to flow through the respective primary coil 22 to induce the respective current in the secondary coil 32 to drive either of the spark plugs 42 and 46. Thus, the control signal 152 and the control signal 154 generated by the ECU 150 is normally high (12 Volts) that transitions to a low or ground value to enable current flow through one of the two primary coils 22. This type of control signal is opposite the embodiment shown in FIG. 9, in which the control signals 132 and 134 have high values when the controller 126 wants to allow current to flow in either direction through the primary coil.

FIG. 13 illustrates an embodiment of the ignition circuit 160 that can work with the low transitioning control signal generated by the ECU 150 shown in FIG. 12 and provide current through the single primary coil 22 in opposite directions, in a similar manner to that described in FIG. 8. In the embodiment shown in FIG. 13, the power source 112 is connected to a first side 114 of the primary coil through a first switching member 162. The power source 112 is connected to an opposite, second side 118 of the primary coil 22 through a second switching member 164.

The first side 114 of the primary coil 22 is connected to ground through a third switching member 166 while the second side 118 of the primary coil 22 is connected to ground through a fourth switching member 168. The configuration in FIG. 13 is similar to that in FIG. 8 except for the conditioning components required for the signals 152 and 154. Thus, depending upon the direction of current flow through the primary coil 22, either the first spark plug 42 or the second spark plug 46 illustrated in FIG. 10 will be activated.

Referring back to FIG. 13, ignition circuit 160 is controlled by signals present at boxes 152 and 154, which are generated by the ECU 150 in FIG. 12. When the ECU 150 generates a first output signal, which is represented by a low value at box 152, the low value turns on the first switching member 162 and the fourth switching member 168. When these two switching members are turned on, current flows from the power source 112 through the first switching member 162, as illustrated by arrow 138. The current flows through the primary coil 22 from the first side 114 to the second side 118. Current leaving the primary coil 22 passes through the fourth switching member 168. As described previously with reference to FIG. 10, when current is flowing from the first side 114 to the second side 118, the current is induced in that direction in the secondary coil 32 and passes through the flow restrictor 40 and to the first spark plug 42. The abrupt disruption of the current flow through the restrictor 40 will cause the first spark plug 42 to generate a spark. Likewise, the abrupt disruption of the current flow in the opposite direction through the restrictor 44 will cause the second spark plug 46 to generate a spark.

After the first flow of current, the ECU 150 opens the connection to ground such that box 152 goes high. Slightly thereafter, the ECU 150 generates a low signal at box 154. Referring back to FIG. 13, when the low signal is present at box 154, current flows through the second switching member 164, as illustrated by arrow 142. When current flows in the direction shown by arrow 142, the current passes through the primary coil 22 from the second side 118 to the first side 114. Since a low value is present at box 154, third switching member 166 is turned on, which allows current to flow through the switching member to ground as illustrated by arrow 142.

In the embodiment shown in FIG. 13, the first and second switching members 162 and 164 are shown as including a MOSFET while transistors are shown as the third and fourth switching members 166 and 168. However, the MOSFETs and transistors could be interchanged or other types of semiconductor switches use whole operating within the scope of the present disclosure. Likewise, the switching members 116, 120, 122 and 124 shown in FIG. 8 could be interchanged or other types of semiconductor switches used.

As described previously with reference to FIG. 10, when current is flowing through the primary coil in the second direction from the second side 118 to the first side 114, the current is induced in the secondary coil 32 and flows through the flow restrictor 44 and into the second spark plug 46. Thus, the direction of current flow through the primary coil 22 controls whether the first spark plug 42 or the second spark plug 46 is activated. As can be understood in FIGS. 12-13, the timing of the current supplied to the pair of spark plugs 42, 46 is controlled by the ECU 150. In this manner, the ECU 150 that was originally designed to control a pair of primary coils 22 for each cylinder of an internal combustion engine can be used with the single, primary coil that allows current to flow in two directions and be used with the two spark plugs 42, 46 shown in FIG. 10.

We claim:

1. An ignition system for use with an internal combustion engine having a first cylinder and a second cylinder, comprising:
   a power supply;
   a primary coil positioned to receive either a first current flowing in a first direction or a second current flowing in a second direction from the power supply, wherein the primary coil forms part of an H-bridge circuit connecting the primary coil to the power supply;
   a secondary coil positioned such that first and second currents are induced into the secondary coil from the primary coil;
   a first spark plug positioned in the first cylinder and coupled to the secondary coil such that only the first current induced in the secondary coil passes to the first spark plug;
   a second spark plug positioned in the second cylinder and coupled to the secondary coil such that only the second current induced in the secondary coil passes to the second spark plug; and
   an engine control unit (ECU) having a first output and a second output that each vary between a high value and a low value, wherein when the first output is at the low value, the first current flows in the first direction through the primary coil and the first spark plug of the first cylinder is activated and when the second output is at the low value, the second current flows in the second direction through the primary coil and the second spark plug of the second cylinder is activated;
   wherein the H-bridge circuit connecting the power supply to the primary coil comprises a first switching member, a second switching member, a third switching member, a fourth switching member, a first diode, and a second diode, and
   wherein the direction of current through the primary coil of the H-bridge circuit determines which of the first spark plug or the second spark plug is activated.

2. The ignition system of claim 1 wherein the first and second currents flow in opposite directions through the primary coil.

3. The ignition system of claim 1 wherein the power supply is a battery.

4. The ignition system of claim 1 wherein the first spark plug is connected to the secondary coil through a first restrictor and the second spark plug is connected to the secondary coil through a second restrictor, wherein the first and second restrictors are positioned to allow only the first current to pass to the first spark plug and only the second current to pass to the second spark plug.

5. The ignition system of claim 4 wherein both the first and second restrictors are diodes.

6. The ignition system of claim 5 wherein the diodes are oriented opposite to each other.

7. The ignition system of claim 1 wherein the power supply is connected to the primary coil through the first switching member and the second switching member and the primary coil is connected to ground through the third switching member and the fourth switching member, wherein the first and second outputs of the controller control the position of the first, second, third and fourth switching members.

8. The ignition system of claim 7 wherein the controller activates the first output to close the first and fourth switching members to allow the first current to flow through the primary coil in the first direction and wherein the controller activates the second output to close the second and third switching members to allow the second current to flow through the primary coil in the second direction.

9. An ignition system for use with an internal combustion engine having a first cylinder, a second cylinder and an engine control unit (ECU) that generates a first output and a second output that each vary between a high value and a low value, comprising:
a power supply;
a primary coil positioned to receive either a first current flowing in a first direction or a second current flowing in a second direction from the power supply, wherein the primary coil forms part of an H-bridge circuit connecting the primary coil to the power supply;
a secondary coil positioned such that first and second currents are induced into the secondary coil from the primary coil;
a first spark plug positioned in the first cylinder and coupled to the secondary coil such that only the first current induced in the secondary coil passes to the first spark plug; and
a second spark plug positioned in the second cylinder and coupled to the secondary coil such that only the second current induced in the secondary coil passes to the second spark plug, wherein the first current flows in the first direction through the primary coil when the first output is at the low value and activates the first spark plug in the first cylinder and the second current flows in the second direction through the primary coil when the second output is at the low value and activates the second spark plug in the second cylinder;
wherein the H-bridge circuit connecting the power supply to the primary coil comprises a first switching member, a second switching member, a third switching member, a fourth switching member, a first diode, and a second diode, and
wherein the direction of current through the primary coil of the H-bridge circuit determines which of the first spark plug or the second spark plug is activated.

10. The ignition system of claim 9, wherein the first and second current flow in opposite directions through the primary coil.

11. The ignition system of claim 9, wherein the power supply is connected to the primary coil through the first switching member and the second switching member and the primary coil is connected to ground through the third switching member and the fourth switching member, and wherein the first and second outputs of the controller control the position of the first, second, third, and fourth switching members.

12. The ignition system of claim 11 wherein the controller activates the first output to close the first and fourth switching members to allow the first current to flow through the primary coil in the first direction and wherein the controller activates the second output to close the second and third switching members to allow the second current to flow through the primary coil in the second direction.

13. A method of controlling the activation of a first spark plug positioned in a first cylinder and a second spark plug positioned in a second cylinder of an internal combustion engine, comprising the steps of:
connecting a power supply to a primary coil through a first switching member and a second switching member;
connecting the primary coil to ground through a third switching member and a fourth switching member;
selectively operating an engine control unit (ECU) to generate a first output signal to close the first switching member and the fourth switching member to allow a first current to flow through the primary coil in a first direction;
selectively operating the ECU to generate a second output signal to close the second switching member and the third switching member to allow a second current to flow through the primary coil in a second direction;
positioning a secondary coil such that first and second currents are induced into the secondary coil by the primary coil;
coupling the first spark plug to the secondary coil such that only the first current induced in the secondary coil flows through the first spark plug and activates the first spark plug in the first cylinder; and
coupling the second spark plug to the secondary coil such that only the second current induced in the secondary coil flows through the second spark plug and activates the second spark plug in the second cylinder,
wherein the first, second, third, and fourth switching members, a first diode, a second diode, and the primary coil form part of an H-bridge circuit connecting the power supply to the primary coil, and
wherein the direction of current through the primary coil of the H-bridge circuit determines which of the first spark plug or the second spark plug is activated.

14. The method of claim 13 wherein the first spark plug is coupled to the secondary coil through a first restrictor and the second spark plug is coupled to the secondary coil through a second restrictor.

15. The method of claim 13 further comprising the steps of:
receiving a timing signal at the controller; and
controlling the generation of the first and second output signals based upon the timing signal.

16. The method of claim 13 wherein the power supply is a battery.

* * * * *